United States Patent
Wei et al.

(10) Patent No.: US 11,126,965 B2
(45) Date of Patent: Sep. 21, 2021

(54) SYSTEMS AND METHODS FOR OPTIMIZATION OF A PRODUCT INVENTORY BY AN INTELLIGENT ADJUSTMENT OF INBOUND PURCHASE ORDERS

(71) Applicant: COUPANG CORP., Seoul (KR)

(72) Inventors: Wei Wei, Shanghai (CN); Guangyao Zhang, Shanghai (CN); Yong Zang, Shanghai (CN); Timothy Schoenharl, Shanghai (CN)

(73) Assignee: Coupang Corp., Seoul (KR)

(*) Notice: Subject to any disclaimer, the term of this patent is extended or adjusted under 35 U.S.C. 154(b) by 0 days.

(21) Appl. No.: 16/849,143

(22) Filed: Apr. 15, 2020

(65) Prior Publication Data

US 2021/0090022 A1 Mar. 25, 2021

Related U.S. Application Data

(63) Continuation of application No. 16/578,652, filed on Sep. 23, 2019, now Pat. No. 10,657,492.

(51) Int. Cl.
*G06Q 10/08* (2012.01)
*G06Q 30/06* (2012.01)
*G06Q 30/02* (2012.01)

(52) U.S. Cl.
CPC ..... *G06Q 10/0875* (2013.01); *G06Q 30/0635* (2013.01); *G06Q 10/08* (2013.01); *G06Q 10/087* (2013.01); *G06Q 30/0202* (2013.01)

(58) Field of Classification Search
CPC ............. G06Q 10/087; G06Q 30/0202; G06Q 30/0635
See application file for complete search history.

(56) References Cited

U.S. PATENT DOCUMENTS 5,854,746 A 12/1998 Yamamoto
6,668,245 B1 12/2003 Iida
(Continued)

FOREIGN PATENT DOCUMENTS

JP 2009-187151 8/2009
KR 2001-0020782 3/2001
(Continued)

OTHER PUBLICATIONS

International Search Report and Written Opinion dated Nov. 13, 2020 in PCT International Application PCT/IB2020/057631, 10 pages.
(Continued)

*Primary Examiner* — A. Hunter Wilder
(74) *Attorney, Agent, or Firm* — Finnegan, Henderson, Farabow, Garrett & Dunner LLP

(57) ABSTRACT

A computer-implemented systems and methods for intelligent generation of purchase orders is disclosed. The system may be configured to execute instructions for: receiving one or more demand forecast quantities of one or more products, the products corresponding to one or more product identifiers, and the demand forecast quantities comprising a demand forecast quantity for each product for each unit of time; receiving supplier statistics data for one or more suppliers, the suppliers being associated with a portion of the products; receiving current product inventory levels and currently ordered quantities of the products; determining preliminary order quantities for the products; constraining the preliminary order quantities to obtain recommended order quantities based at least on the supplier statistics data, the current product inventory levels, and the currently ordered quantities; and generating purchase orders to the suppliers for the products based on the recommended order quantities.

12 Claims, 10 Drawing Sheets

(56) References Cited

U.S. PATENT DOCUMENTS

| | | |
|---|---|---|
| 8,214,238 B1 | 7/2012 | Fairfield |
| 8,781,882 B1 | 7/2014 | Arboletti |
| 2002/0138316 A1 | 9/2002 | Katz |
| 2002/0178077 A1 | 11/2002 | Katz |
| 2006/0010017 A1 | 1/2006 | Hase |
| 2014/0095249 A1 | 4/2014 | Tarakad |
| 2014/0310048 A1 | 10/2014 | Murray et al. |
| 2016/0048788 A1 | 2/2016 | Martin |
| 2018/0315008 A1* | 11/2018 | Koudal .............. G06Q 10/0639 |

FOREIGN PATENT DOCUMENTS

| | | |
|---|---|---|
| KR | 10-2012-0017262 | 2/2012 |
| KR | 10-2019-0049299 | 5/2019 |
| TW | 357310 | 5/1999 |
| TW | 522323 | 3/2003 |

OTHER PUBLICATIONS

Examination Report dated Jan. 18, 2021, by the Australian Patent Office in Australian Application No. 2020260570, 7 pages.
Office Action dated Sep. 10, 2020, by the Korean Patent Office in Korean Patent Application No. 10-2019-0127278, 19 pages.
Office Action dated May 31, 2021, by the Taiwanese Patent Office in corresponding Taiwanese Application No. 109127446, 15 pages.
Examination Report No. 2 dated Jul. 29, 2021, in counterpart Australian Application No. 2020260570, 6 pages.

* cited by examiner

| Rule Priority | Rule Description |
|---|---|
| 1 | Maximum quantity rule for products in A-E2 categories |
| 2 | Maximum quantity rule for products in E3-F categories |
| 3 | When category > "D" && inventory >= "1" && avg28daysSales <= "0", set ROQ = 0 |
| 4 | When forecast21Avg == "0" && openOrder >= "1", set ROQ = 0 |
| 5 | When forecast21Avg == "0" && inventory >= "1", set ROQ = 0 |
| 6 | Promotion scheme |
| 7 | Coverage period extension per coverage period length range |
| 8 | Minimum quantity rule for products in category E |
| 9 | Coverage period extension 5 days for Saturday deliveries |
| 10 | Adjust safety stock periods and critical ratios based on category |

SYSTEMS AND METHODS FOR OPTIMIZATION OF A PRODUCT INVENTORY BY AN INTELLIGENT ADJUSTMENT OF INBOUND PURCHASE ORDERS

RELATED APPLICATIONS

This application is a continuation of U.S. patent application Ser. No. 16/578,652 (now allowed) filed on Sep. 23, 2019, which is hereby incorporated by reference in the present application.

TECHNICAL FIELD

The present disclosure generally relates to computerized methods and systems for optimizing product inventory by intelligently adjusting purchase orders for incoming products. In particular, embodiments of the present disclosure relate to inventive and unconventional systems that generate a preliminary order quantity based on demand forecast of products, adjust the preliminary order quantity based on real-world constraints, and generate purchase order with the constrained quantities.

BACKGROUND

With proliferation of the Internet, online shopping has become one of the major avenues of commerce. Consumers and businesses are purchasing goods from online vendors more frequently than ever, and the number of transactions and sales revenue are projected to grow year-over-year at a staggering rate. As the scope and volume of e-commerce continue to grow, both a number of different products available online and an average number of purchases made in a given period are growing exponentially. It has thus become very important to keep inventory of the products and to keep items in stock even through fluctuating demands.

Fundamentally, keeping products in stock involves predicting future demand, checking current inventory level, determining a right quantity to order, and placing orders for an additional quantity or manufacturing the same. Many prior art systems have automated this process of placing orders for the additional quantity. However, determining the right quantity involves a delicate balance of maintaining enough inventory to meet future demand while keeping the inventory to a minimum to prevent surplus or unnecessary storage fee. For example, not ordering enough products in advance runs the risk of going out of stock, which directly translates to lost revenue. On the other hand, ordering too many can result in an overstock, which may incur maintenance fee and occupy a space that can be dedicated to other more lucrative products. Lead times or shipping times that suppliers require also further complicate the process of ordering new products in response to sudden increases in demand.

Ordering more products is also limited by a processing capacity of a receiving end. The receiving end, a store itself or a warehouse for example, has a limit on how many products it can receive and stock into its inventory for sale in a given period of time. The store may order however many number of products it needs in order to meet demand, but it will not be able to sell them if the incoming quantity exceeds its inbound processing capacity. Thus, the process of determining the right quantities requires a constant monitoring of product inventory and adjustment of various parameters through a feed forward loop that adjusts the parameters for future orders based on trends and performances in the past.

Therefore, there is a need for improved methods and systems for keeping product inventory at an optimum level by intelligently adjusting inbound purchase orders to determine the right quantity of products to order.

SUMMARY

One aspect of the present disclosure is directed to a computer-implemented system for intelligent generation of purchase orders, the system comprising: a memory storing instructions; and at least one processor configured to execute the instructions. The instructions may comprise: receiving one or more demand forecast quantities of one or more products, the products corresponding to one or more product identifiers, and the demand forecast quantities comprising a demand forecast quantity for each product for each unit of time; receiving supplier statistics data for one or more suppliers, the suppliers being associated with a portion of the products; receiving current product inventory levels and currently ordered quantities of the products; determining preliminary order quantities for the products; constraining the preliminary order quantities to obtain recommended order quantities based at least on the supplier statistics data, the current product inventory levels, and the currently ordered quantities; and generating purchase orders to the suppliers for the products based on the recommended order quantities.

Yet another aspect of the present disclosure is directed to a computer-implemented method for intelligent generation of purchase orders. The method may comprise: receiving one or more demand forecast quantities of one or more products, the products corresponding to one or more product identifiers, and the demand forecast quantities comprising a demand forecast quantity for each product for each unit of time; receiving supplier statistics data for one or more suppliers, the suppliers being associated with a portion of the products; receiving current product inventory levels and currently ordered quantities of the products; determining preliminary order quantities for the products; constraining the preliminary order quantities to obtain recommended order quantities based at least on the supplier statistics data, the current product inventory levels, and the currently ordered quantities; and generating purchase orders to the suppliers for the products based on the recommended order quantities.

Furthermore, another aspect of the present disclosure is directed to a computer-implemented system for intelligent generation of purchase orders. The system may comprise: a first database storing one or more order histories and one or more demand histories of one or more products, the products corresponding to one or more product identifiers; a second database storing one or more product inventory levels and one or more currently ordered quantities of the products, the second database being associated with one or more warehouses configured store the products; a memory storing instructions; and at least one processor configured to execute the instructions. The instructions may comprise: determining, using the order histories and the demand histories from the first database, one or more demand forecast quantities of the products; determining, using the order histories from the first database, supplier statistics data of one or more suppliers associated with the products, the supplier statistics data comprising one or more fulfillment ratios associated with the suppliers and the products; receiving, from the second database, the current product inventory levels and the currently ordered quantities of the products; determining preliminary order quantities for the products; constraining the preliminary order quantities to obtain recommended order quantities based at least on the fulfillment ratios, the current product inventory levels, and the currently ordered quantities; generating purchase orders to the suppliers for the products based on the recommended order quantities; receiving products at the warehouses in response to the generated purchase orders; determining the fulfillment ratios based on the received products; updating the supplier statistics data with the determined fulfillment ratios; performing the steps for constraining the preliminary order quantities based on the updated supplier statistics data to obtain a new set of recommended order quantities; and generating purchase orders to the suppliers for the products based on the new set of recommended order quantities.

Other systems, methods, and computer-readable media are also discussed herein.

BRIEF DESCRIPTION OF THE DRAWINGS

FIG. 6 is a table of exemplary set of rules for constraining preliminary order quantities, consistent with the disclosed embodiments.

DETAILED DESCRIPTION

Figure 1A:
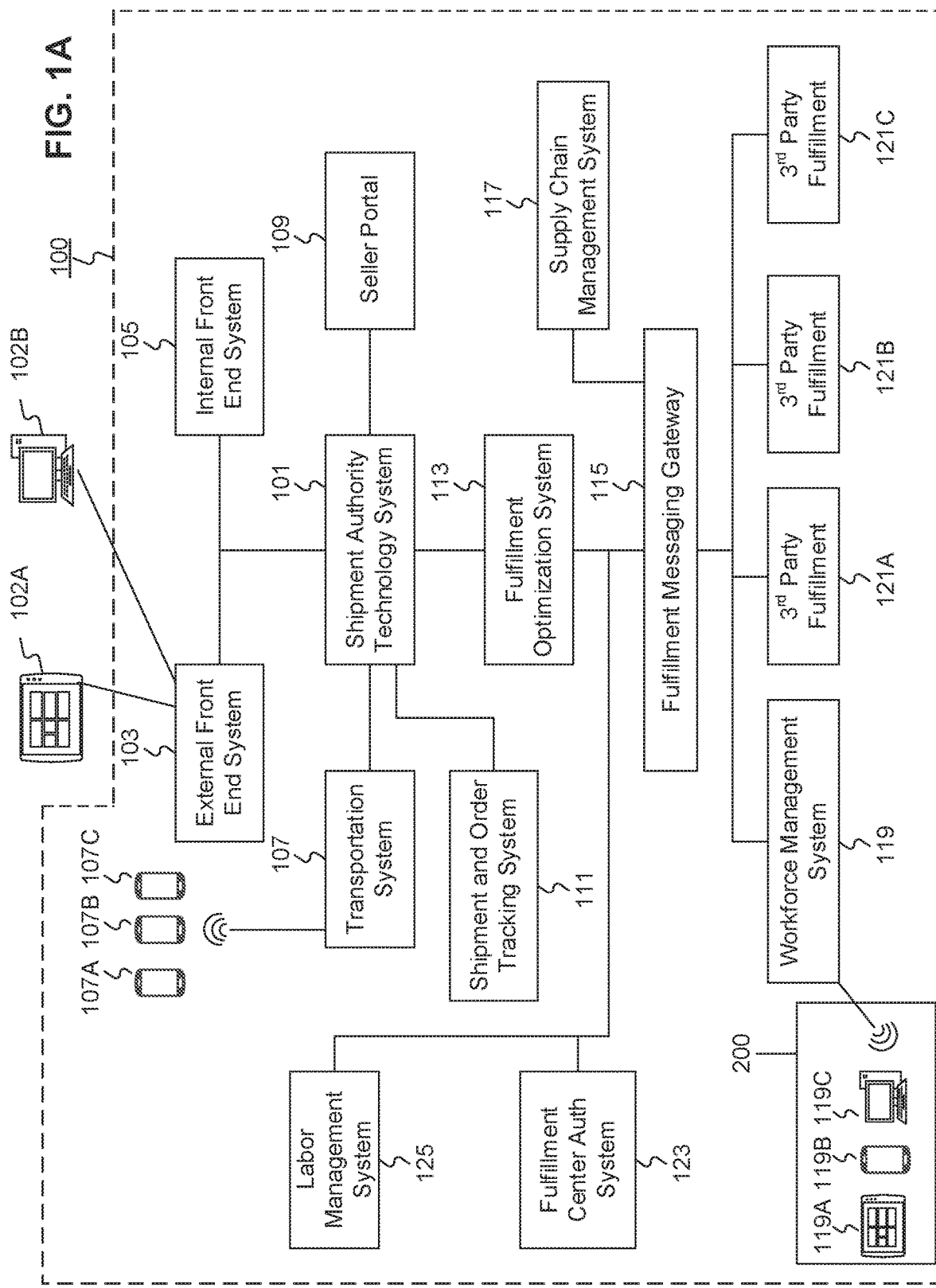
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to computer-implemented systems and methods for optimizing product inventory by determining an optimal quantity to order based on demand and real-world constraints.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, workforce management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where network 101 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from workforce management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Workforce management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMA 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
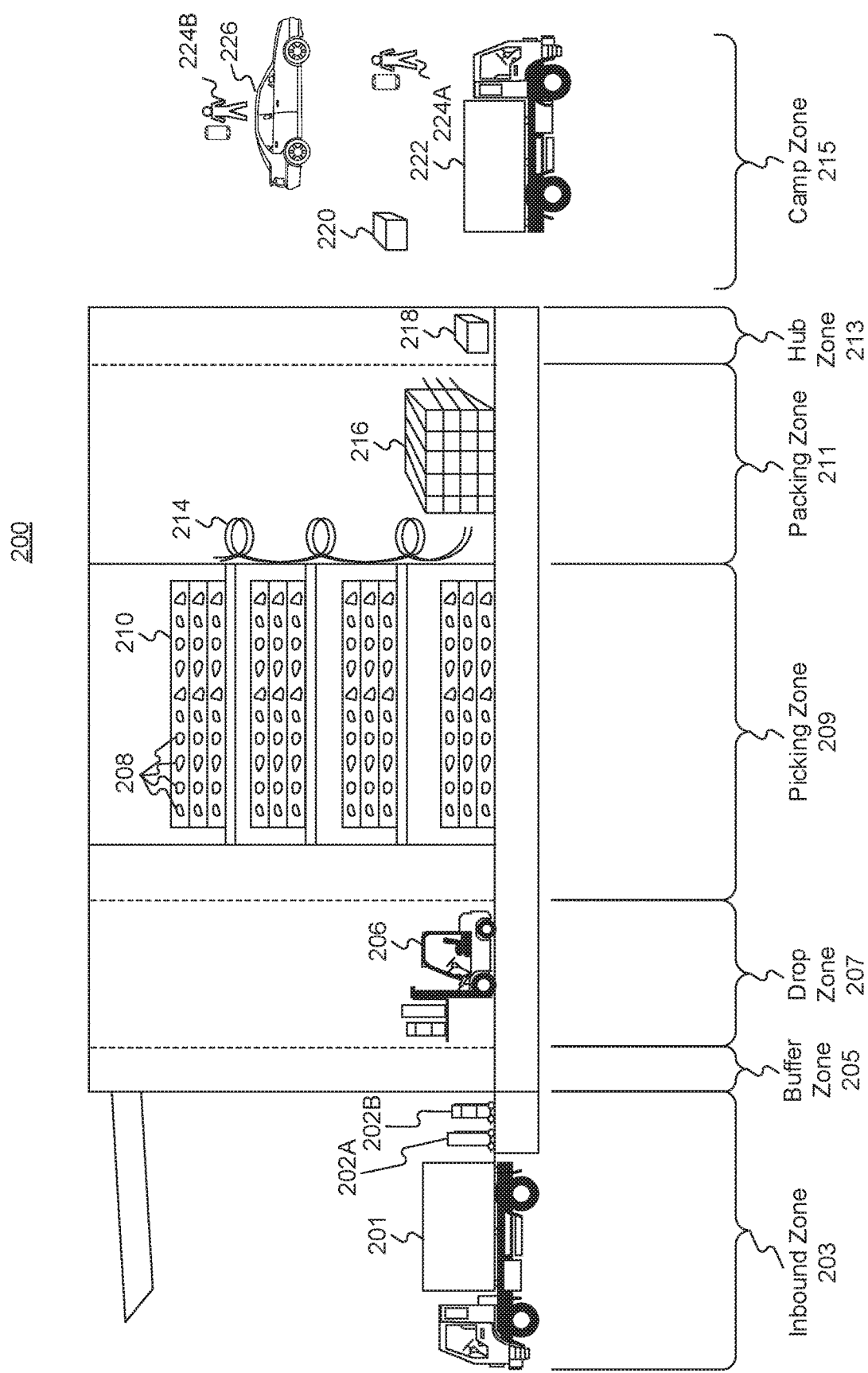
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1196.

Once a user places an order, a picker may receive an instruction on device 1196 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
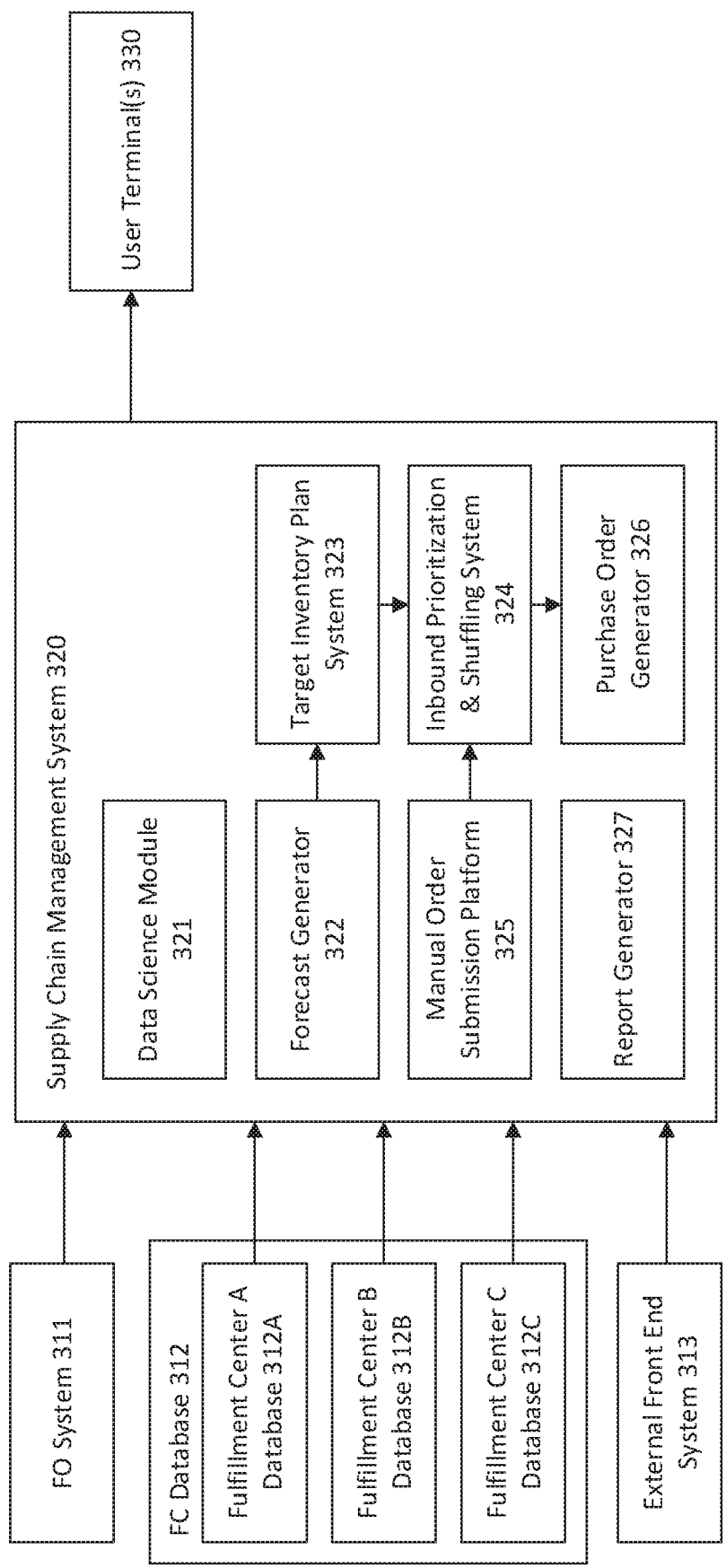
FIG. 3 is a schematic block diagram illustrating an exemplary embodiment of a networked environment comprising computerized systems for keeping product inventory at an optimum level, consistent with the disclosed embodiments.

FIG. 3 is a schematic block diagram illustrating an exemplary embodiment of a networked environment 300 comprising computerized systems for keeping product inventory at an optimum level. Environment 300 may include a variety of systems, each of which may be connected to one another via one or more networks. The systems may also be connected to one another via a direct connection, for example, using a cable. The depicted systems include an FO system 311, an FC database 312, an external front end system 313, a supply chain management system 320, and one or more user terminals 330. FO system 311 and external front end system 313 may be similar in design, function, or operation to FO system 113 and external front end system 103 described above with respect to FIG. 1A.

FC database 312 may be implemented as one or more computer systems that collect, accrue, and/or generate various data accrued from various activities at FC 200 as described above with respect to FIG. 2. For example, data accrued at FC database 312 may include, among others, product identifiers (e.g., stock keeping unit (SKU)) of every product handled by a particular FC (e.g., FC 200), an inventory level of each product over time, and frequency and occurrences of out of stock events for each product.

In some embodiments, FC database 312 may comprise FC A database 312A, FC B database 312B, and FC C database 312C, which represent databases associated with FCs A-C. While only three FCs and corresponding FC databases 312A-C are depicted in FIG. 3, the number is only exemplary and there may be more FCs and a corresponding number of FC databases. In other embodiments, FC database 312 may be a centralized database collecting and storing data from all FCs. Regardless of whether FC database 312 includes individual databases (e.g., 312A-C) or one centralized database, the databases may include cloud-based databases or on-premise databases. Also in some embodiments, such databases may comprise one or more hard disk drives, one or more solid state drives, or one or more non-transitory memories.

Supply Chain Management System (SCM) 320 may be similar in design, function, or operation to SCM 117 described above with respect to FIG. 1A. Alternatively or additionally, SCM 320 may be configured to aggregate data from FO system 311, FC database 312, and external front end system 313 in order to forecast a level of demand for a particular product and generate one or more purchase orders in a process consistent with the disclosed embodiments.

In some embodiments, SCM 320 comprises a data science module 321, a demand forecast generator 322, a target inventory plan system (TIP) 323, an inbound prioritization and shuffling system (IPS) 324, a manual order submission platform 325, a purchase order (PO) generator 326, and a report generator 327.

In some embodiments, SCM 320 may comprise one or more processors, one or more memories, and one or more input/output (I/O) devices. SCM 320 may take the form of a server, general-purpose computer, a mainframe computer, a special-purpose computing device such as a graphical processing unit (GPU), laptop, or any combination of these computing devices. In these embodiments, components of SCM 320 (i.e., data science module 321, demand forecast generator 322, TIP 323, IPS 324, manual order submission platform 325, PO generator 326, and report generator 327) may be implemented as one or more functional units performed by one or more processors based on instructions stored in the one or more memories. SCM 320 may be a standalone system, or it may be part of a subsystem, which may be part of a larger system.

Alternatively, components of SCM 320 may be implemented as one or more computer systems communicating with each other via a network. In this embodiment, each of the one or more computer systems may comprise one or more processors, one or more memories (i.e., non-transitory computer-readable media), and one or more input/output (I/O) devices. In some embodiments, each of the one or more computer systems may take the form of a server, general-purpose computer, a mainframe computer, a special-purpose computing device such as a GPU, laptop, or any combination of these computing devices.

Data science module 321, in some embodiments, may include one or more computing devices configured to determine various parameters or models for use by other components of SCM 320. For example, data science module 321 may develop a forecast model used by demand forecast generator 322 that determines a level of demand for each product. In some embodiments, data science module 321 may retrieve order information from FO system 311 and glance view (i.e., number of webpage views for the product) from external front end system 313 to train the forecast model and anticipate a level of future demand. The order information may include sales statistics such as a number of items sold over time, a number of items sold during promotion periods, and a number of items sold during regular periods. Data science module 321 may train the forecast model based on parameters such as the sales statistics, glance view, season, day of the week, upcoming holidays, and the like. In some embodiments, data science module 321 may also receive data from inbound zone 203 of FIG. 2 as products ordered via POs generated by PO generator 326 are received. Data science module 321 may use such data to determine various supplier statistics such as a particular supplier's fulfillment ratio (i.e., a percentage of products that are received in a saleable condition compared to an ordered quantity), an estimated lead time and shipping period, or the like.

Demand forecast generator 322, in some embodiments, may include one or more computing devices configured to forecast a level of demand for a particular product using the forecast model developed by data science module 321. More specifically, the forecast model may output a demand forecast quantity for each product, where the demand forecast quantity is a specific quantity of the product expected to be sold to one or more customers in a given period (e.g., a day). In some embodiments, demand forecast generator 322 may output demand forecast quantities for each given period over a predetermined period (e.g., a demand forecast quantity for each day over a 5-week period). Each demand forecast quantity may also comprise a standard deviation quantity (e.g., ±5) or a range (e.g., maximum of 30 and minimum of 25) to provide more flexibility in optimizing product inventory levels.

TIP 323, in some embodiments, may include one or more computing devices configured to determine a recommended order quantity for each product. TIP 323 may determine the recommended order quantity by first determining preliminary order quantities for the products and constraining the preliminary order quantities with real-world constraints. The processes for determining the recommended order quantities are described below in more detail with respect to FIGS. 4 and 5.

IPS 324, in some embodiments, may include one or more computing devices configured to prioritize the recommended order quantities. IPS 324 may prioritize the recommended order quantities for different products based on a set of urgency scores assigned to each product. For example, IPS 324 may sort the recommended order quantities by product based on the urgency scores, make further adjustments to the quantities based on corresponding current inventory levels, and order the products in sequence from top-priority products to low-priority products. In some embodiments, the urgency scores may be determined through a machine learning model, where the machine learning model is trained with data from data science module 321 and the urgency scores are logit values of the machine learning model. Logit values refer to unnormalized or raw predictions or probability values of a model as known in the art. For example, a logit value may be expressed as $$\ln\left(\frac{P}{1-P}\right),$$

where P is a probability that a particular event will occur.

In further embodiments, IPS 324 may also assign the recommended order quantities to one or more FCs 200 based on their respective inbound processing capacities. The inbound processing capacity of a particular FC may be based on a number of factors such as a number of workers at the FC, available storage space, currently open purchase orders waiting for shipment from one or more suppliers, and the like.

Manual order submission platform 325, in some embodiments, may include one or more computing devices configured to receive user inputs for one or more special orders. Manual order submission platform 325 may comprise a user interface accessible via one or more computing devices such as internal front end system 105 of FIG. 1A. The special orders may include extra quantities of certain products that the user may deem necessary and allow manual adjustments (e.g., increasing or decreasing by a certain amount) of the preliminary order quantities or the recommended order quantities. The user may also specify a particular FC as a receiving location so that the special orders may get assigned to the particular FC. In some embodiments, portions of the order quantities submitted via manual order submission platform 325 may be marked or flagged (e.g., by updating a parameter associated with the portion of the order quantity) so that they may not be adjusted (i.e., constrained) by TIP 323 or IPS 324. In some embodiments, manual order submission platform 325 may be implemented as a computer or computers running software such as the Apache HTTP Server, Microsoft Internet Information Services (IIS), NGINX, or the like. In other embodiments, manual order submission platform 325 may run a custom web server software designed to receive and process user inputs from one or more user terminals 330 and provide responses to the received user inputs.

PO generator 326, in some embodiments, may include one or more computing devices configured to generate POs to one or more suppliers based on the recommended order quantities or results of the distribution by IPS 324. SCM 320, by this point, would have determined a recommended order quantity for each product that requires additional inventory, where each product has one or more suppliers that procure or manufacture the particular product and ship it to one or more FCs. A particular supplier may supply one or more products, and a particular product may be supplied by one or more suppliers. When generating POs, PO generator 326 may issue a paper PO to be mailed or faxed to the supplier or an electronic PO to be transmitted to the same.

Report generator 327, in some embodiments, may include one or more computing devices configured to generate reports periodically in response to a predetermined protocol or on-demand in response to user inputs via, for example, user terminals 330 or internal front end system 105 of FIG. 1A. The reports may range from simple ones that output certain information such as the recommended order quantity for a particular product to complex ones that require analysis of historical data and visualized in a graph.

User terminals 330, in some embodiments, may include one or more computing devices configured to enable users to access SCM 320 via manual order submission platform 325 or report generator 327. User terminals 330 may include any combination of computing devices such as personal computers, mobile phones, smartphones, PDAs, or the like. In some embodiments, internal users such as those working at an FC may use user terminals 330 to access a web interface provided by manual order submission platform 325 in order to submit one or more manual orders.

Figure 4:
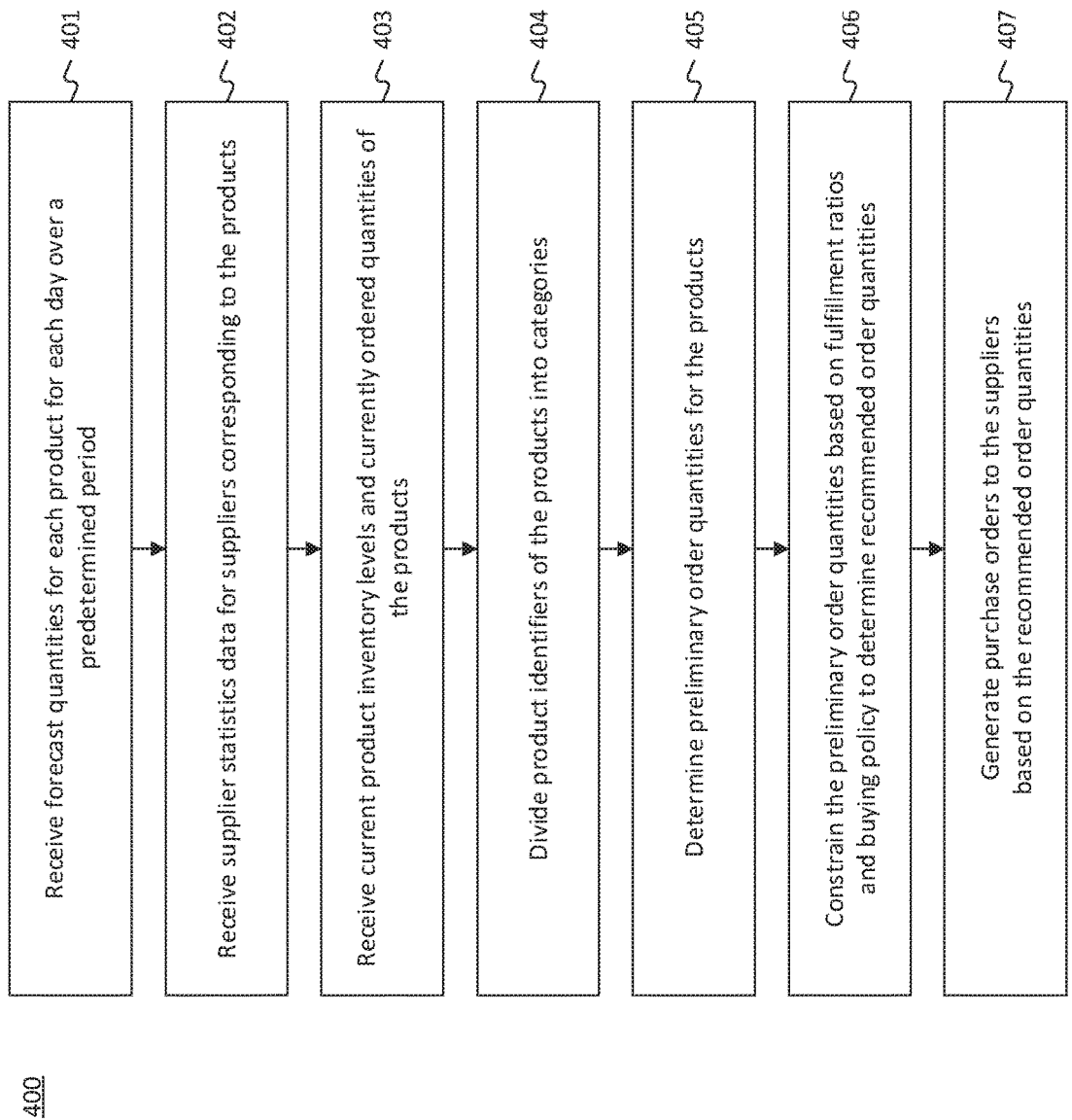
FIG. 4 is a flowchart of an exemplary computerized process for intelligent adjustment of inbound purchase orders to keep product inventory at optimum level, consistent with the disclosed embodiments.

FIG. 4 is a flowchart of an exemplary computerized process 400 for intelligent adjustment of inbound purchase orders to keep product inventory at an optimum level. In some embodiments, process 400 may be performed by SCM 320 using information from other networked systems (e.g., FO system 311, FC database 312, and external front end system 313) as described above. In one aspect, all steps of process 400 may be performed by TIP 323, with the exception of step 407, which may be performed by PO generator 326. In another aspect, all steps may be performed by TIP 323 or any other system(s). In some embodiments, SCM 320 may repeat steps 401-407 at predetermined intervals such as once a day. Still further, SCM 320 may perform process 400 for all, or substantially all, products that have been stocked or sold before. Each product may be associated with a unique product identifier such as a stock keeping unit (SKU).

At step 401, TIP 323 may receive a demand forecast quantity for each product from demand forecast generator 322. In some embodiments, the demand forecast quantities may be in the form of a table of numerical values organized by SKU in one dimension and number of units forecasted to be sold for a given day in the other dimension. The table may also comprise additional dimensions devoted to other parameters of the demand forecast quantity such as standard deviation, maximum, minimum, average, or the like. Alternatively, the demand forecast quantities may take the form of multiple arrays of values organized by SKU and dedicated to each parameter. Other suitable forms of organizing the same data are equally applicable as known in the art and are within the scope of this invention.

At step 402, TIP 323 may receive, from data science module 321, supplier statistics data of one or more suppliers that supply the products. The supplier statistics data may comprise a set of information (e.g., fulfillment ratio described above) associated with each supplier. In some embodiments, there may be multiple sets of supplier statistics data for a particular supplier where each set of data is associated with a particular product supplied by the supplier.

At step 403, TIP 323 may also receive, from FC databases 312, current product inventory levels and currently ordered quantities of each product. The current product inventory level may refer to an instantaneous count of a particular product at the time of data retrieval, and the currently ordered quantity may refer to a total quantity of a particular product that has been ordered through one or more POs generated in the past and is waiting for delivery to corresponding FCs.

At step 404, TIP 323 may divide product identifiers, and thus the products, into one or more categories in the order of respective demand forecast quantities. In some embodiments, there may be 6 categories such as category A, category B, category C, category D, category E, and category F. Still further, one or more of the categories may be further divided into subcategories such as category E1, category E2, category E3, and category E4. In some embodiments, TIP 323 may divide the products by sorting the product identifiers based on their respective demand forecast quantities and assigning a category to each product in sequence so that each category may end up with an equal number of products. In other embodiments, TIP 323 may distribute the product identifiers based on predetermined percentages, where, for example, top 1% of the products based on their respective demand forecast quantities are assigned to category A, next 3% are assigned to category B, and so on. The distribution may also be based on a fixed number or proportion of products per category with the last category being assigned to all remaining products. In some embodiments, various components of SCM 320 may apply different rules or priorities to the products based on the categories as described below.

At step 405, TIP 323 may determine preliminary order quantities for each product based on a range of parameters. In some embodiments, a preliminary order quantity for a particular product may be a function of at least one of its demand forecast quantity, a coverage period, a safety stock period, current inventory level, currently ordered quantity, a critical ratio, and a case quantity. For example, TIP 323 may determine a preliminary order quantity with formula (1):

$$Q_p = \text{ceiling}\left(\frac{\left(\sum_{n=0}^{P_c+P_s-1} Q_{fn}\right) - Q_c - Q_o}{c}\right) \cdot C \quad (1)$$

where $Q_p$ is a preliminary order quantity for a particular product; $Q_{fn}$ is a demand forecast quantity of the product for nth day from the time of calculation; $Q_c$ is the current inventory level of the product; $Q_o$ is the currently ordered quantity; $P_c$ is the coverage period; $P_s$ is the safety stock period; and C is the case quantity.

As used herein, a coverage period may refer to a length of time (e.g., number of days) one PO is planned to cover; and a safety stock period may refer to an additional length of time (e.g., additional number of days) the PO is should cover in case of an unexpected event such as a sudden increase in demand or a delayed delivery. For example, given the following table of sample demand forecast quantities for product X, a coverage period for a PO generated at D-day may be 5 and a safety stock period may be 1, in which case the raw order quantity, $\sum_{n=0}^{P_c+P_s-1} Q_{fn}$, in formula (1) would equal 37+37+35+40+41+34=224.

TABLE 1

Sample demand forecast quantity for product X over 9 days

| Forecast | D | D + 1 | D + 2 | D + 3 | D + 4 | D + 5 | D + 6 | D + 7 | D + 8 |
|---|---|---|---|---|---|---|---|---|---|
| $Q_f$ | 37 | 37 | 35 | 40 | 41 | 34 | 37 | 39 | 41 |

From this quantity, 224 units of product X, TIP 323 may subtract the current inventory level (e.g., 60 units) and the currently ordered quantity (e.g., 40), which comes out to be 124 units. This number may then be rounded up to a multiple of the case quantity (i.e., the number of units that the product comes packaged in such as the number of units in a box or a pallet) by being divided by the case quantity, being rounded up to an integer, and being multiplied by the case quantity again, which, in this example, comes out to be 130 units assuming a case quantity of 10 as an example.

In some embodiments, the coverage period may be a predetermined length of time equal to or greater than an expected length of time a corresponding supplier may take to deliver the products from the date of PO generation. Additionally or alternatively, TIP 323 may also adjust the coverage period based on other factors such as the day of the week, anticipated delay, or the like. Furthermore, the safety stock period may be another predetermined length of time designed to increase the preliminary order quantity as a safety measure. The safety stock period may reduce the risk of running out of stock in case of unexpected events such as a sudden increase in demand or an unanticipated shipping delay. In some embodiments, TIP 323 may set the safety stock period based on the coverage period, where, for example, a safety stock period of 0 day is added when a coverage period is 1-3 days, 1 day is added when a coverage period is 4-6 days, and 3 days are added when a coverage period is greater than 7 days.

In further embodiments, the raw order quantity, $\sum_{n=0}^{P_c+P_s-1} Q_{fn}$, in formula (1) may be adjusted by a critical ratio, $r_c$, based on formula (2):

$$\sum_{n=0}^{P_c+P_s-1} Q_{fn} + r_c * \sqrt{\sum_{n=0}^{P_c+P_s-1} D_n^2} \quad (2)$$

where $D_n$ is a standard deviation of demand forecast quantity, $Q_{fn}$, and is determined by forecast generator 322. As used herein, the critical ratio may refer to a predetermined ratio configured to balance a risk of overstocking or understocking the products. In further embodiments, the critical ratio may vary based on a category assigned to a particular product.

Despite the complex process of determining the preliminary order quantities described above, the preliminary order quantity may be based primarily on customer demand and not take real-world constraints into account. A step for accounting for such constraints is thus desired in order to optimize product inventories.

At step 406, TIP 323 may constrain the preliminary order quantities based on the supplier statistics data received from data science module 321 and a set of buying policies designed to adjust the preliminary order quantities further in order to determine recommended order quantities. Details of such constraining process is described below with respect to FIG. 5 in more detail.

In some embodiments, the resulting quantities output from TIP 323 may serve as recommended order quantities to be transmitted to PO generator 326 and be ordered. In other embodiments, the resulting quantities may further be processed by IPS 324 to prioritize particular products and/or distribute the quantities to one or more FCs as described above with respect to FIG. 3.

At step 407, PO generator 326 may generate POs based on the recommended order quantities from TIP 323 or IPS 324 as described above with respect to FIG. 3.

Figure 5:
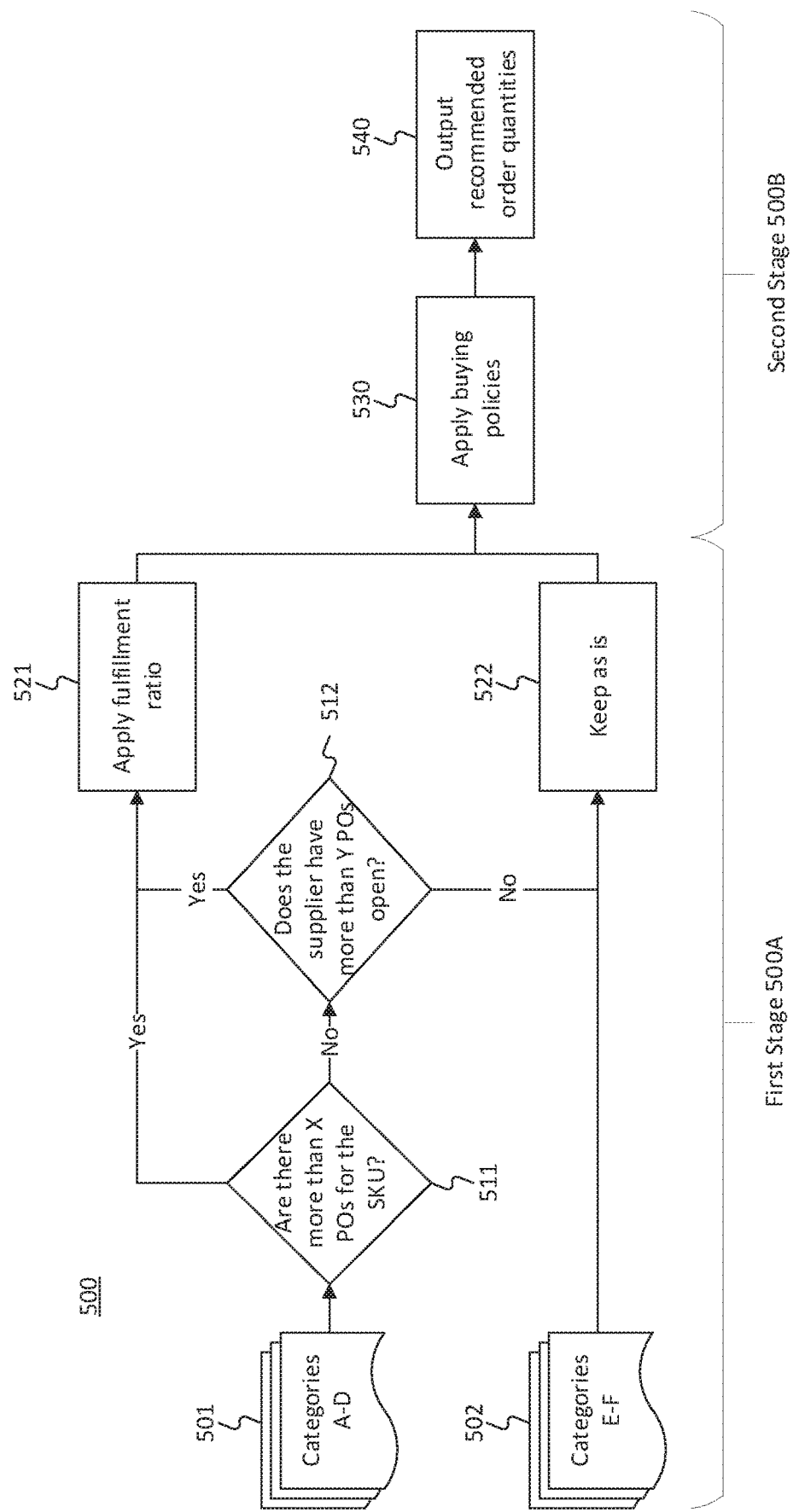
FIG. 5 is a flowchart of an exemplary computerized process for constraining preliminary order quantities based on a plurality of considerations, consistent with the disclosed embodiments.

An exemplary computerized process 500 for constraining the preliminary order quantities to determine the recommended order quantities based on one or more real-world constraints is shown in FIG. 5. For clarity, process 500 may be described in two different stages depicted as a first stage 500A and a second stage 500B. The two stages only serve to describe process 500 and do not serve to limit process 500 in any particular implementation.

First stage 500A, in some embodiments, may apply a fulfillment ratio to preliminary order quantities associated with only a subset of the products. Starting from steps 501 and 502, for example, TIP 323 may only consider the preliminary order quantities associated with the products in categories A-D, while keeping the preliminary order quantities associated with the products in categories E-F unchanged at step 522. For the quantities associated with the products in categories A-D, TIP 323 may determine, at step 511, whether a particular product has more than a certain number (i.e., a threshold) of outstanding POs that have not been delivered yet—20 POs for example. Additionally or alternatively, TIP 323 may determine, at step 512, whether a supplier for the particular product has more than a certain total number (i.e., threshold) of outstanding POs of all products from the supplier that have not been delivered yet—25 POs for example. If positive for either of the two considerations, TIP 323 may apply fulfillment ratio for the particular product at step 521.

As used herein, fulfillment ratio may be a parameter determined from data science module 321 as part of the supplier statistics data. In some embodiments, a fulfillment ratio may be based on a percentage of products that are received in a saleable condition compared to an ordered quantity. For example, a fulfillment ratio of 60% for a particular product supplied by a particular supplier indicates that, on average, only 60% of the products delivered by the supplier arrive in saleable condition. As such, when fulfillment ratio is applied to a preliminary order quantity of a particular product, the preliminary order quantity is increased by the fulfillment ratio. For example, when the fulfillment ratio is a percentage value, the preliminary order quantity may be divided by the fulfillment ratio, thus increasing the order quantity to account for the number of items expected to be received in a non-saleable condition.

In some embodiments, the fulfillment ratio may fluctuate based on, among others, a fragility of the product (e.g., perishable, fragile, etc.), day of the week (i.e., as a PO with a delivery period over a weekend may take longer to be delivered and thus increase the risk of damaging the product), reliability of the supplier (e.g., defective items), or the like. Applying the fulfillment ratio may allow TIP 323 to estimate a more accurate number of products that can be expected to be delivered for those products with higher demand (based on category) and under stricter constraints (based on number of POs). In some embodiments, TIP 323 may also apply fulfillment ratio to all products regardless of the category.

In some embodiments, TIP 323 may determine fulfillment ratio from supplier statistics data determined by data science module 321. TIP 323 may determine the fulfillment ratio by extracting past order quantities and actual received quantities of a particular product from supplier statistics data and determining a historical trend (e.g., moving average) of a ratio between the past order quantities and the actual received quantities. In some embodiments, TIP 323 or data science module 321 may update the fulfillment ratio periodically as new orders are received.

Second stage 500B, in some embodiments, may apply a set of rules called buying policies to the preliminary order quantities and determine recommended order quantities at step 530. The buying policies may comprise a hierarchical set of rules that are applied to the preliminary order quantities and affect various parameters used for determining the preliminary order quantities. In some embodiments, the buying policies may comprise those listed in table 600 of FIG. 6, which are described in more detail below.

Step 540 of second stage 500B may conclude constraining process 500 and output recommended order quantities for the products, which are then transmitted to PO generator 326 as described above with respect to FIG. 4.

FIG. 6 is a table 600 of exemplary set of rules for constraining preliminary order quantities. In some embodiments, step 530 of applying buying policies in FIG. 5 applies the set of rules listed in table 600 to further constrain the preliminary order quantities after steps 521 or 522. Each of the exemplary rules in table 600 is described below in the order of priority indicated in the first column of table 600. The set of rules, their respective priority, or any of the values and thresholds therein, however, are only exemplary and other rules, priorities, or values are within the scope of disclosed embodiments.

Referring to the first and second rules, TIP 323 may apply a maximum quantity rule to each preliminary order quantity based on its respective category. A maximum quantity rule may refer to a maximum order quantity for a particular product, where the maximum order quantity is determined based on a number of days the corresponding preliminary order quantity is planned to cover (i.e., coverage period) and a demand forecast quantity of the product. For example, when the coverage period is set to 20 days and the demand forecast quantity is 10, TIP 323 would limit the preliminary order quantity for the particular product to 200. A maximum quantity rule may be set individually for each product or for each category.

Referring to the third rule, for the products that fall into a lower category than "D," TIP 323 may set their respective recommended order quantities to 0 for those that still have some quantity left in stock and have not been sold in the past 28 days.

Next, referring to the fourth and fifth rules, TIP 323 may set a recommended order quantity for a product as 0 when the product currently has an inbound purchase order that has not been delivered yet and the demand forecast quantity is 0 for the next 21 days. Similarly, TIP 323 may set the recommended order quantity as 0 when the product has any quantity in stock and the demand forecast quantity is 0 for the next 21 days.

Referring to the sixth rule, TIP 323 may switch recommended order quantities of a subset of products to a different scheme for a special promotion (e.g., discount).

Referring to the seventh rule, TIP 323 may extend coverage periods by a predetermined number of days called safety stock periods as described above with respect to FIG. 4. The safety stock periods may be determined based on coverage periods of each product, where, for example, a coverage period between 1 and 3 days may not be extended; a coverage period between 3 and 6 days are extended by a day; and a coverage period longer than 9 days are extended by 3 days. In some embodiments, TIP 323 may extend the coverage periods for only the products in higher categories (e.g., categories A-D).

Referring to the eighth rule, TIP 323 apply minimum quantity rules to preliminary order quantities, where TIP 323 may increase preliminary order quantity of a particular product below a predetermined threshold to be at or above the threshold. The threshold may be set individually for each product or for each category.

Referring to the ninth rule, TIP 323 may extend the coverage period by a predetermined number of days (e.g., 5 days) for any product whose expected delivery day falls on a Saturday.

And referring to the tenth rule, TIP 323 may adjust coverage periods and critical ratios of products based on their respective categories.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for intelligent generation of purchase orders, the system comprising:
   a memory storing instructions; and
   one or more processors configured to execute the instructions for:
      receiving event data in a first format from one or more machines reading one or more products from an inbound zone;
      converting the received event data to a second format;
      generating, based on the converted event data, supplier statistics data comprising a fulfillment ratio between a quantity of received products of the one or more products in a saleable condition and a quantity of ordered products of the one or more products for the one or more suppliers;
      receiving one or more demand forecast quantities of the one or more products;
      receiving current product inventory levels of the one or more products;
      determining preliminary order quantities for the one or more products based on the one or more demand forecast quantities;
      constraining the preliminary order quantities to obtain recommended order quantities based at least on the current product inventory levels and the supplier statistics data, wherein constraining the preliminary order quantities comprises dividing the preliminary order quantities by the fulfillment ratio for the one or more products or a subset of the one or more products; and
      generating purchase orders for the one or more products based on the recommended order quantities.

2. The computer-implemented system of claim 1, wherein determining the preliminary order quantities comprises adjusting the demand forecast quantities based on a predetermined ratio configured to balance a risk of overstocking or understocking the products.

3. The computer-implemented system of claim 1, wherein determining the preliminary order quantities comprises obtaining a period of time for which the preliminary order quantities is intended to last.

4. The computer-implemented system of claim 3, wherein determining the preliminary order quantities further comprises extending the period of time by a predetermined amount to cover an additional period of time.

5. The computer-implemented system of claim 1, wherein the instructions further comprise receiving one or more product supply parameters for the one or more products, and wherein determining the preliminary order quantities is further based on the product supply parameters.

6. The computer-implemented system of claim 1, wherein determining the preliminary order quantities comprises adjusting the preliminary order quantities by a predetermined multiplier based on one or more categories associated with the one or more products.

7. A computer-implemented method for intelligent generation of purchase orders, the method comprising:
   receiving, by one or more processors, event data in a first format from one or more machines reading one or more products from an inbound zone;
   converting, by the one or more processors, the received event data to a second format;

generating, by the one or more processors and based on the converted event data, supplier statistics data comprising a fulfillment ratio between a quantity of received products of the one or more products in a saleable condition and a quantity of ordered products of the one or more products for the one or more suppliers;

receiving, by the one or more processors, one or more demand forecast quantities of the one or more products;

receiving, by the one or more processors, current product inventory levels of the one or more products;

determining, by the one or more processors, preliminary order quantities for the one or more products based on the one or more demand forecast quantities;

constraining, by the one or more processors, the preliminary order quantities to obtain recommended order quantities based at least on the current product inventory levels and the supplier statistics data, wherein constraining the preliminary order quantities comprises dividing the preliminary order quantities by the fulfillment ratio for the one or more products or a subset of the one or more products; and generating, by the one or more processors, purchase orders for the one or more products based on the recommended order quantities.

8. The computer-implemented method of claim 7, wherein determining the preliminary order quantities comprises adjusting the demand forecast quantities based on a predetermined ratio configured to balance a risk of overstocking or understocking the products.

9. The computer-implemented method of claim 7, wherein determining the preliminary order quantities comprises obtaining a period of time the preliminary order quantities is intended to last.

10. The computer-implemented method of claim 9, wherein determining the preliminary order quantities further comprises extending the period of time by a predetermined amount to cover an additional period of time.

11. The computer-implemented method of claim 7, further including receiving one or more product supply parameters for the one or more products, and wherein determining the preliminary order quantities is further based on the product supply parameters.

12. The computer-implemented method of claim 7, wherein determining the preliminary order quantities comprises adjusting the preliminary order quantities by a predetermined multiplier based on one or more categories associated with the one or more products.

* * * * *